United States Patent [19]
Porter

[11] 3,760,573
[45] Sept. 25, 1973

[54] ASPARAGUS HARVESTER

[76] Inventor: Wellington W. Porter, R.D. No. 2, Dublin Rd., Waterloo, N.Y. 13165

[22] Filed: Aug. 4, 1971

[21] Appl. No.: 176,375

Related U.S. Application Data

[63] Continuation of Ser. No. 853,451, Aug. 27, 1969, abandoned.

[52] U.S. Cl.............. 56/327 A, 56/12.9, 56/185, 56/305
[51] Int. Cl............................................. A01d 45/00
[58] Field of Search............ 56/12.8, 12.9, 181–188, 56/305, 327 A

[56] References Cited
UNITED STATES PATENTS

| | | | |
|---|---|---|---|
| 3,328,943 | 7/1967 | Marmorine et al. | 56/327 A |
| 847,568 | 3/1907 | Gerbing | 56/305 |
| 2,795,922 | 6/1957 | Hume | 56/181 X |
| 3,581,483 | 6/1971 | Kohl | 56/327 A |
| 3,472,009 | 10/1969 | Porter | 56/327 A |
| 1,165,169 | 12/1915 | Hawkins | 56/305 X |

FOREIGN PATENTS OR APPLICATIONS

| | | | |
|---|---|---|---|
| 12,785 | 11/1896 | Great Britain | 56/188 |

Primary Examiner—Louis G. Mancene
Assistant Examiner—James A. Oliff
Attorney—F. P. Heiper

[57] ABSTRACT

Asparagus harvester having a reciprocating cutter assembly, means for moving the cutter assembly over an asparagus bed at substantially ground level, an inclined ramp extending upwardly and rearwardly from the cutter assembly having a rectangular sectioned downwardly and rearwardly directed nozzle directing air blast toward the cutter assembly from a location forward and above the assembly to move cut asparagus up the ramp, to an impervious inclined belt conveyor having side walls for guiding the blast along and above the conveyor, and a pallet box support disposed below the upper end of the conveyor that can be raised from ground level to a position above ground level to carry the pallet box below the upper end of the conveyor.

6 Claims, 8 Drawing Figures

INVENTOR.
WELLINGTON W. PORTER.

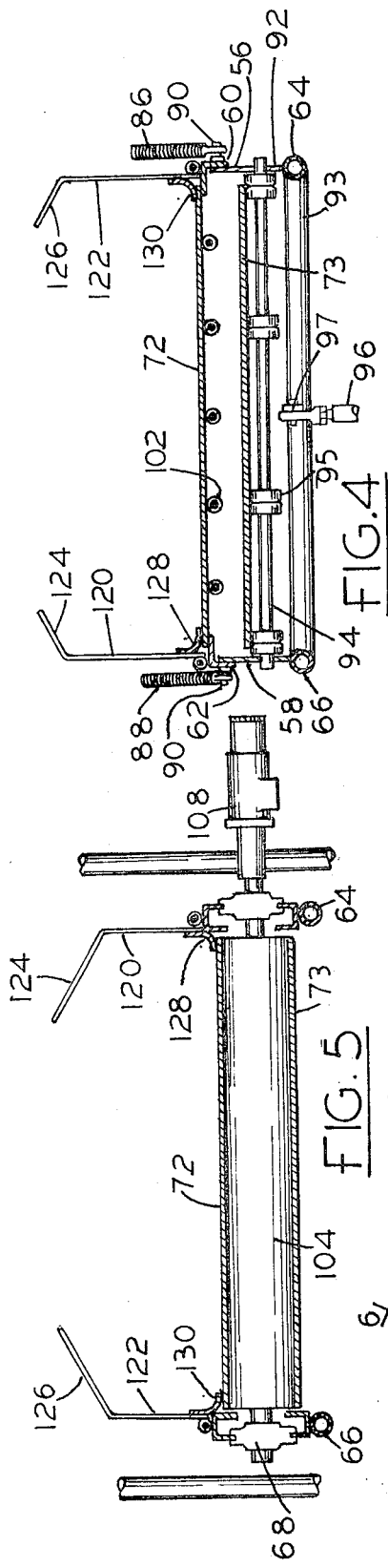
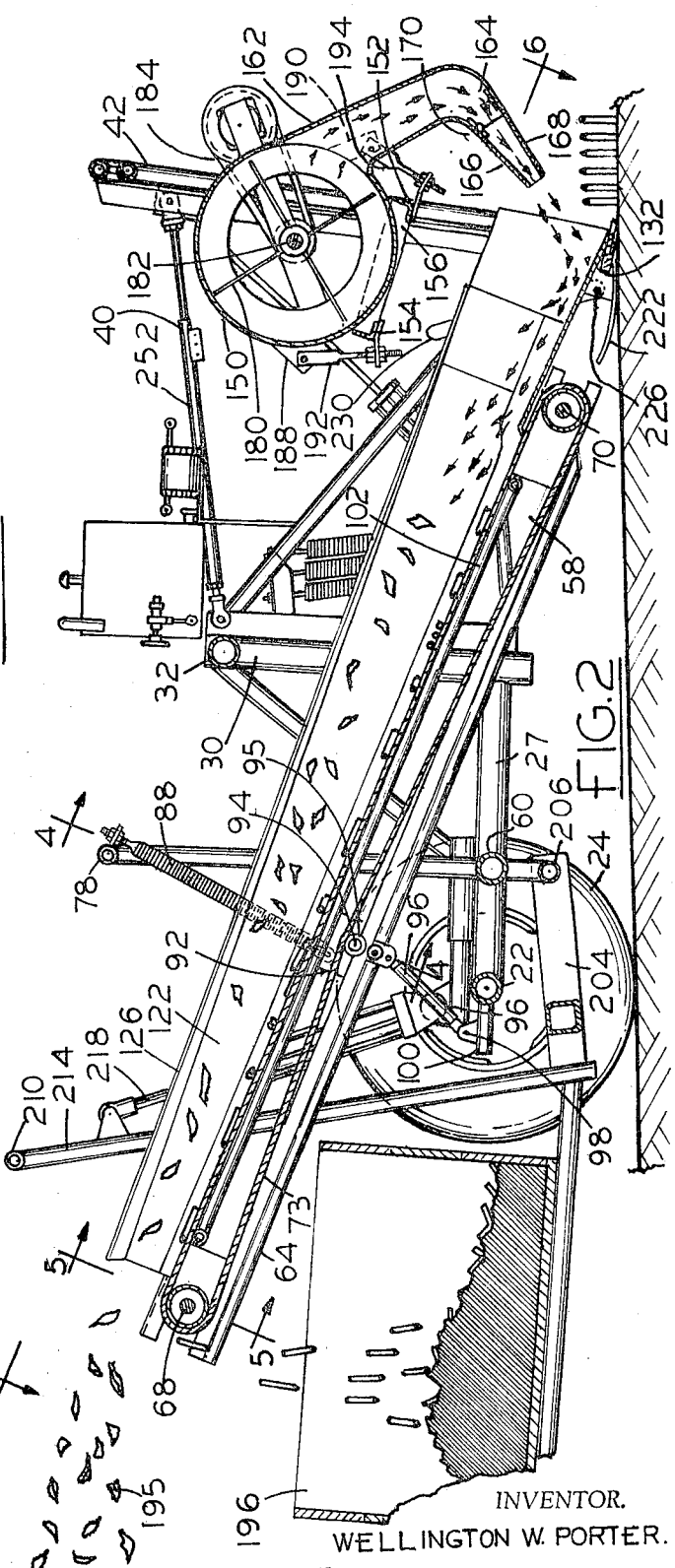
INVENTOR.
WELLINGTON W. PORTER.
BY
ATTORNEY

INVENTOR.
WELLINGTON W. PORTER
BY
ATTORNEY

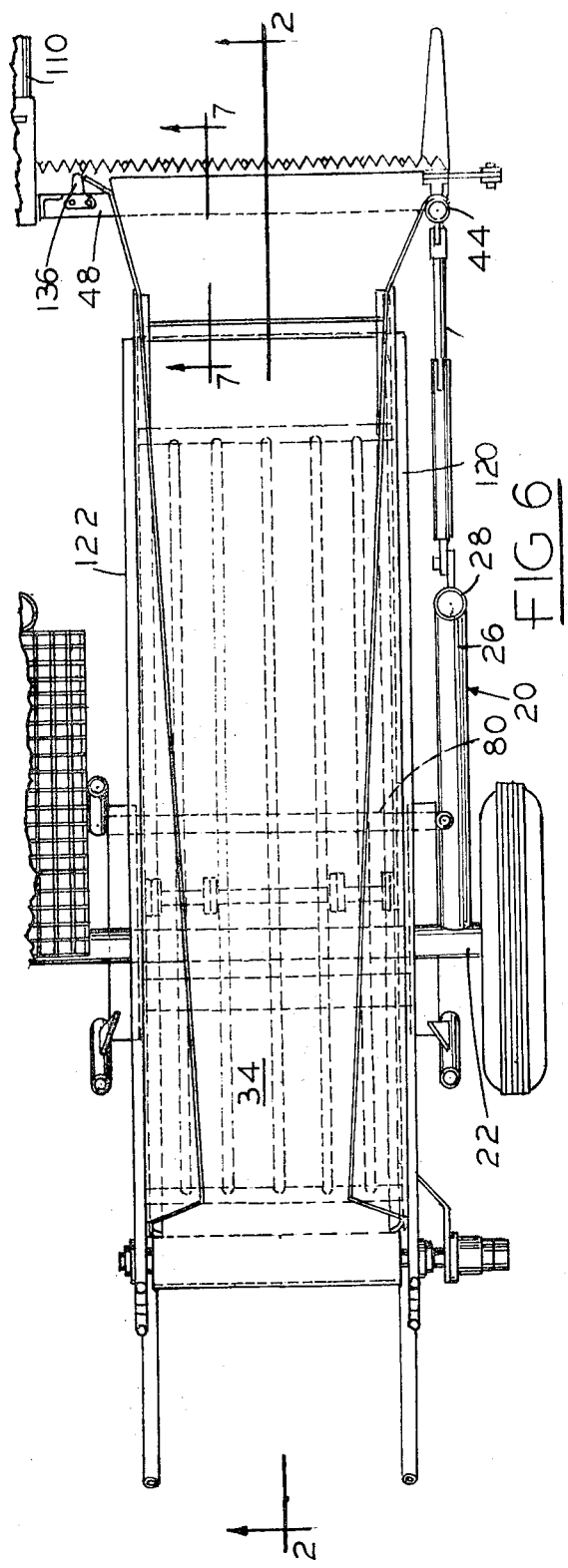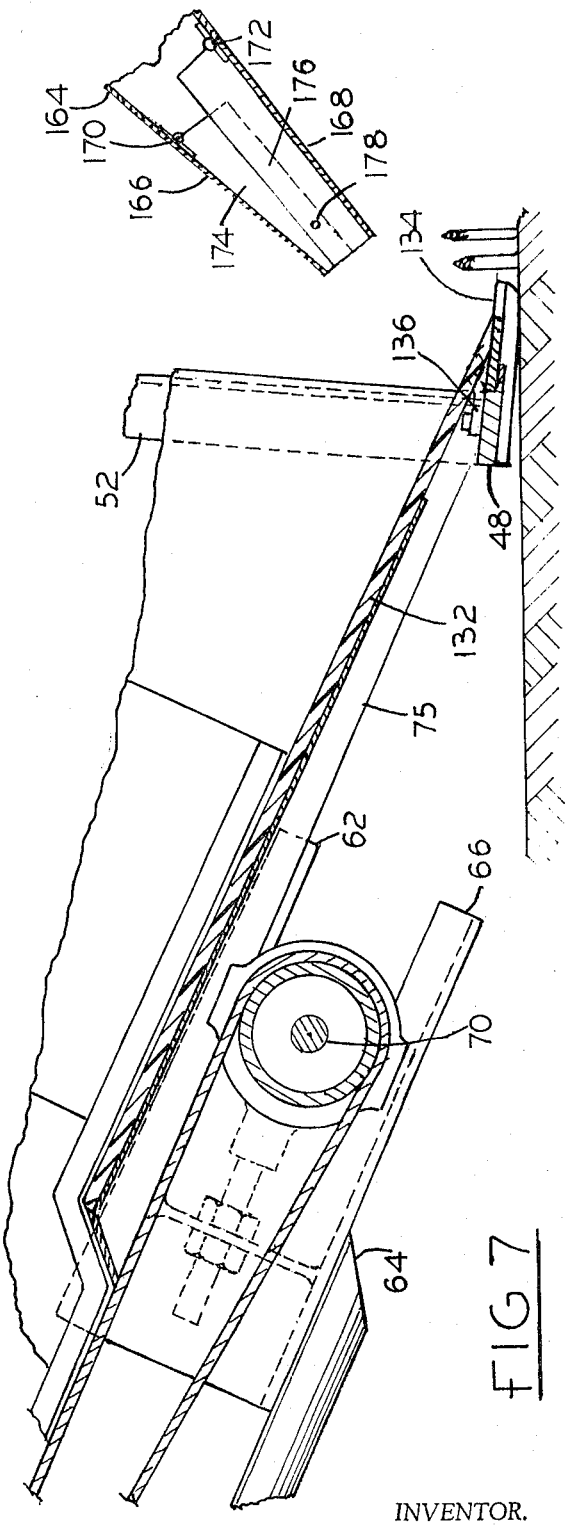

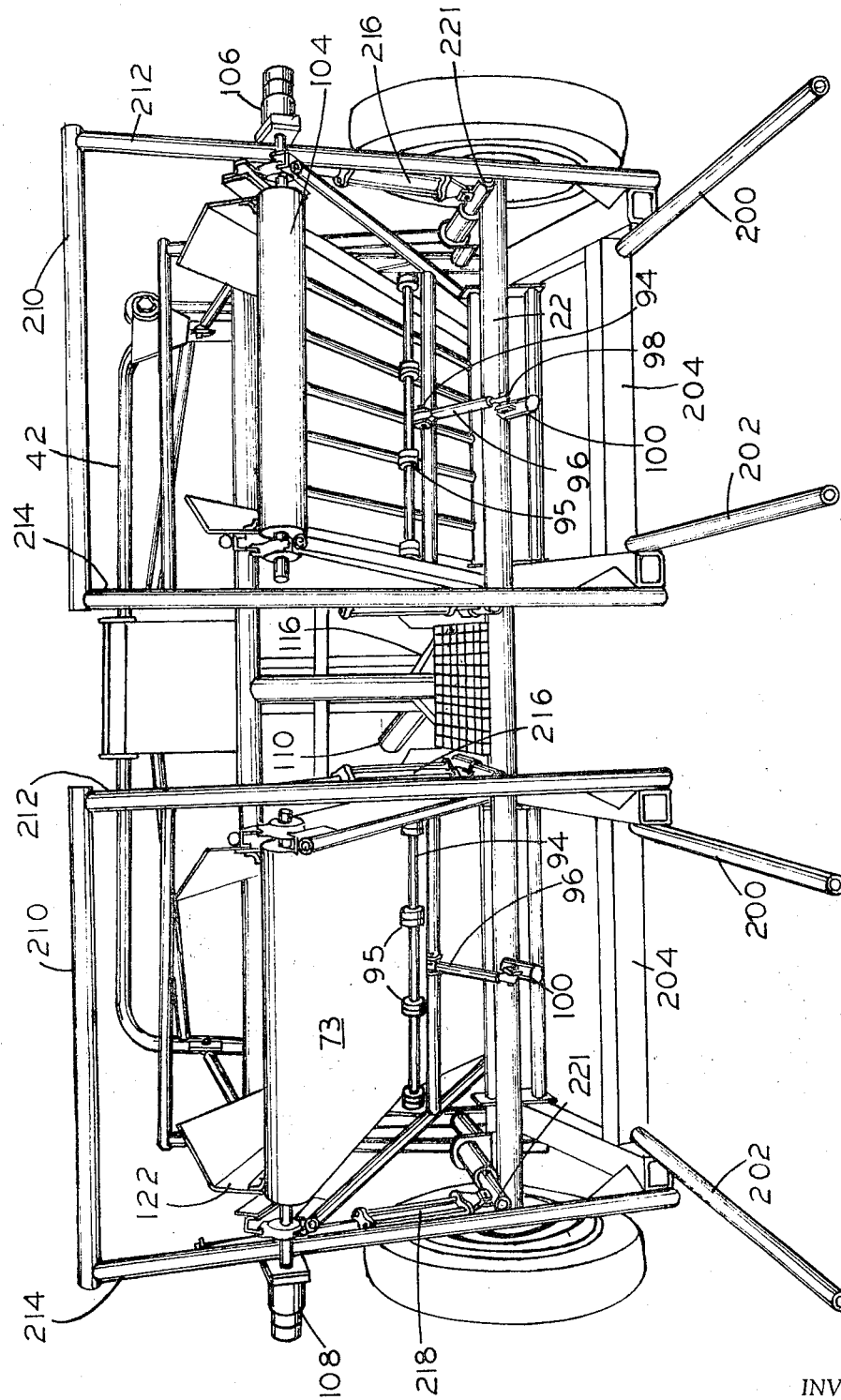

ASPARAGUS HARVESTER

This application is a continuation of application Ser. No. 853,451, filed Aug. 27, 1969, and now abandoned.

This invention relates to harvesters for asparagus.

The manual harvest of asparagus is laborious, and to cover the field often by manual labor is uneconomic. The present apparatus like that shown in copending application Ser. No. 484,326 filed Sept. 1, 1965, now U.S. Pat. No. 3,472,009 issued Oct. 14, 1969 and copending application filed Aug. 11, 1969, Ser. No. 848,773, are adapted to quickly cover an asparagus field from day to day, as the crop is in season. While full length asparagus stems may not be cut in this manner, the cutting of all asparagus stems frequently, close to the ground, irrespective of growth, not only stimulates growth, but provides a harvest that is highly desirable for canning, in any event, as well as a substantial harvest of tall stems suitable for the market.

The present invention is an improvement over the disclosures referred to above in that the conveyors are impervious, and aided by an air column confining side wall construction, the cutter has closely pitched cutting teeth, and movement up the conveyor is effected by an air blast from an elongate nozzle of a rotary air pump, which can be closely set to direct an airstream of the desired cross-section, directed downwardly and rearwardly at the cutter bar support, and at the foot of the ramp which forms a part of the cutter bar hold down.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 2 is a longitudinal sectional view through one side of the harvester, as for example on the line 2—2 of FIG. 6;

FIG. 4 is a sectional view taken on the line 4—4 of FIG. 2;

FIG. 5 is a sectional view taken on the line 5—5 of FIG. 2;

FIG. 6 is a view looking down towards one side of the harvester, with parts removed above the section line 6—6 of FIG. 2;

FIG. 7 is an enlarged fragmentary sectional view of the front end taken substantially on the line 7—7 of FIG. 6, and FIG. 8 is a rear perspective view of the apparatus.

Figure 1:
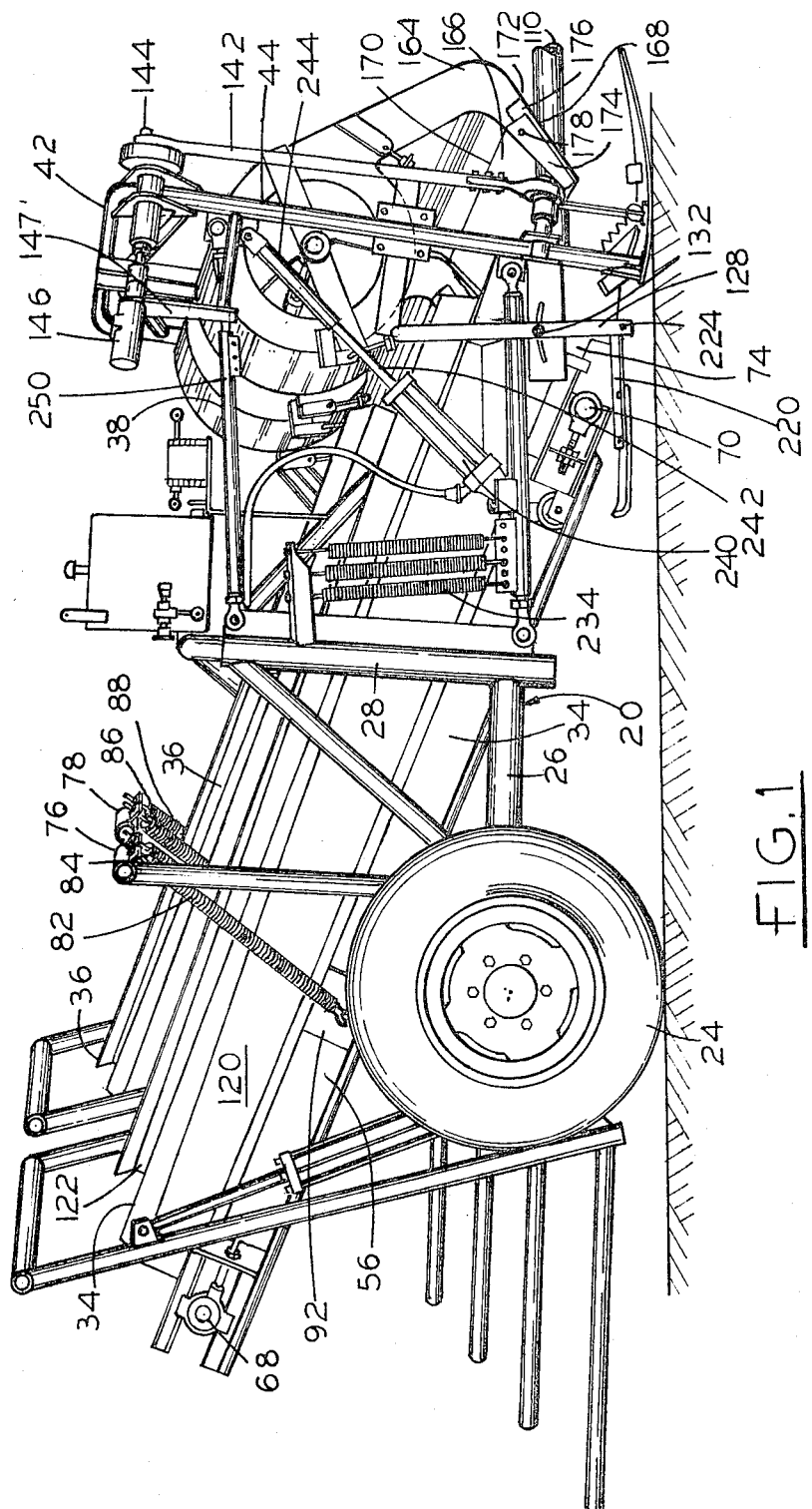
FIG. 1 is a side perspective view of the harvester.

Referring to the drawings there is shown a frame 20 including an axle 22 having wheels 24, and forwardly extending members 26 and 27 terminating at uprights 28 and 30 connected at the upper ends with a transverse member 32. The members 28, 30 and 32 comprise an inverted "U" frame or arch through which extend right and left hand conveyors 34 and 36. Flexibly supported forward of the arch on parallelogram linkages 38 and 40, is a floating frame 42 comprising an inverted "U," the side members of 44 and 46 of which extend to and are affixed to the ends of a transverse cutter support bar 48. The floating frame and linkages are similar in most respects to the structure shown in U.S. Pat. Nos. 2,614,379 and 2,729,049. The frame 42 is stiffened by diagonal 50, and vertical struts 52 and 54 extend to and are affixed to the center of the cutter support bar 48.

Inclined conveyor side members 56 and 58 each having angle iron upper members 60 and 62 and lower tubular members 64 and 66 have upper and lower conveyor belt bearings 68 and 70 over which runs an endless canvas vulcanized rubber conveyor belt 72. The lower ends of the angle iron members 60 and 62 are provided with extensions 74 and 75 the forward ends of which are affixed to the cutter support bar 48.

Inverted conveyor hanger frames 76 and 78 bridge each conveyor and extend upwardly from the side members 26 and 27, and a transverse member 80, extending from side member 26 to side member 27, parallel with, but forward of the axle 22. The upper end of each conveyor is resiliently supported by tension springs 82 and 84, and 86 and 88 extending from the respective hanger frames 76 and 78 to perches such as 90 on side plates 92 joining the angle and tubular members such as 60 and 64 and 62 and 66 of the conveyor side members 56 and 58. A roller support 94 disposed between the side plates 92 on opposite sides of the conveyor is provided with rollers 95 to support the return reach 73 of the conveyor belt clear of a transverse bar 93 extending between the tubular side members 64 and 66 of the conveyor, which transverse member, at its center is swivelly connected as at 97 to a strut 96 extending to a swivel connection 98 on a rearwardly extending perch 100 affixed to the axle 22.

Figure 3:
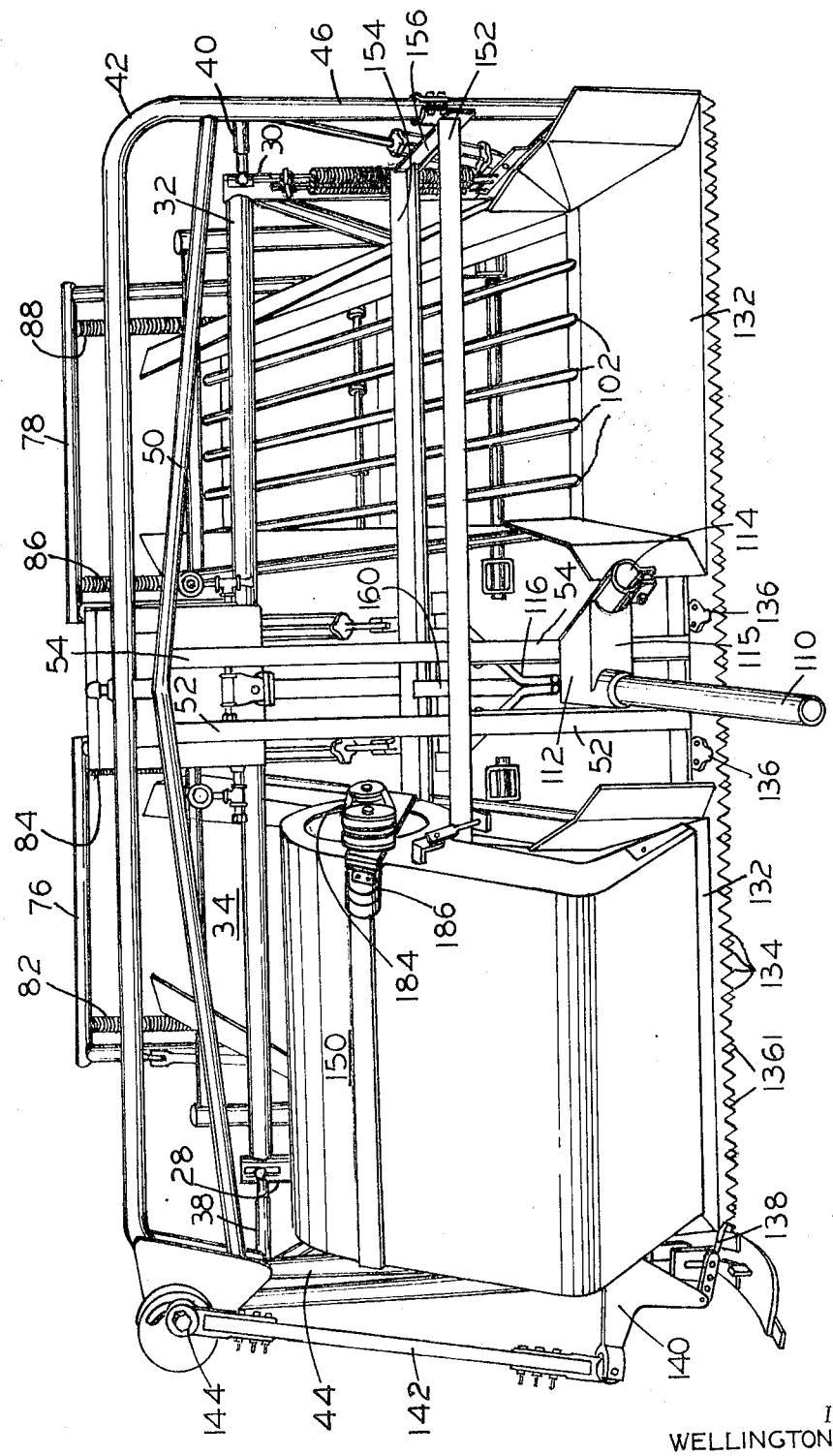
FIG. 3 is a front perspective view, with the conveyor belt and blower removed from one side of the harvester.

As seen in FIG. 3, the conveyor shown to the right, has its conveyor belt removed to show the series of tubular bars 102 extending lengthwise of the conveyor to support the conveyor belt uniformly along its length of travel.

The upper roll 104 of each of the conveyors 56 and 58 is driven by hydraulic motors 106 and 108 respectively, deriving their power from a hydraulic power take off of a tractor, adapted to be coupled to the draw bar 110, which may be disposed in the central sleeve 112 as shown, or the inclined sleeve 114, for pulling from the side of the harvester, draw bar fitting 115 being disposed on the forward end of the "Y" 116, which extends rearwardly between the struts 52 and 54 back to the frame assembly, as for example transverse member 80.

Each of the conveyors are provided with side members 120 and 122 of decreasing height, and having inturned flanges 124 and 126 of increasing width from the lower end to the upper end. Flexible seals 128 and 130 yieldingly engage the side edges of the conveyor belts. Extending from the cutter bar 48, and affixed thereto is an inclined ramp 132 extending to the lower end of the conveyor belt. The lower edge 134 of the ramp is mitered and bears against the reciprocating cutters to hold the reciprocating bar in its groove in the cutter bar support member 48, the usual resilient hold down fingers such as 136, being eliminated through the width of each conveyor ramp 132. The construction of the cutter assembly corresponds substantially with that shown in U.S. Pat. No. 2,706,374, with the exception that the cutter blade teeth 134 are preferably more pointed than 60°, and are disposed at a one inch pitch, with the cutter shoes 1361 at a three inch pitch. The cutter bar is reciprocated by a connecting rod 138, bell crank 140 and pitman 142 leading to a crank 144 driven by an hydraulic motor 146 having a torque arm 147, also powered from the tractor. The points of the cutter shoes project only about halfway forward beneath the cutting edges of the blade teeth.

In order to move the asparagus, as it is cut from the cutter knives to the conveyors, and assure its movement up the conveyor, while separating the dirt, stems, leaves and other foreign matter, an air pump having an inclined adjustable elongated nozzle of a length commensurate with the width of the apron, is provided for each conveyor. To support the pump, which comprises a generally cylindrical housing 150, a rectangular frame including spaced angle irons 152 and 154 is provided above the conveyor aprons. The ends of the angle irons 152 and 154 are tied together as at 156 and 158 and affixed to the floating frame uprights 44 and 46. The forward iron 152 is affixed to struts 52 and 54, and tied to angle iron 154 at the center as at 160.

The cylindrical housing 150 is provided with a tangential tapered nozzle 162, having a rearward and downward bend 164. The nozzle end is provided with top and bottom adjustable nozzle discharge or orifice forming plates 166 and 168 hinged as by piano hinges 170 and 172 to the upper and lower surfaces of the nozzle portion 164. The orifice plates have over-lapping side flanges 174 and 176, and when adjusted to provide the correct orifice width and proper angle, the side flanges may be locked together as by a bolt 178. Within each housing 150 is a rotary pump having four radial elongate blades 180 fixed to a drive shaft 182 driven at high speed by a belt drive 184 from a hydraulic motor 186.

The housing 150 is provided with ears 188 and 190 with adjustable tension members 192 and 194 that hold the housing 150 in the cradle formed by the angle irons 152 and 154. By adjusting the length of the tension members the blower can be rotated to alter the nozzle angle, and by adjustment of the orifice plates 166 and 168 an air blast of suitable thickness, and extending across the entire width of the apron is adapted to blow the asparagus up the ramp onto the conveyor and to provide suction ahead of the jet to cause the asparagus, the instant it is cut, to travel up the conveyor.

By reason of the reducing height of the side walls 120 and 122 along the conveyor, and the increasing width and inclination of the flanges 124 and 126, the air blast promptly carries the leaves and waste above the conveyor bed for discharge out the rear as indicated at 195 while the asparagus is carried on the belt without damage, to the upper end where it drops into a pallet box 196.

A pallet support for a pallet box, beneath the end of each conveyor is provided in the form of rearwardly extending arms 200 and 202 projecting from a forward frame 204 pivoted as at 206 beneath the transverse member 80. Each pallet is provided with a lifting arch 210, the side members 212 and 214 of which are connected through upwardly extending hydraulic jacks 216 and 218, to perches 221 projecting rearwardly from the axle 22. By introducing hydraulic fluid into the jacks the pallet arms 200 and 202 are raised to the position shown to clear the ground during harvest and transport. By lowering the jacks, the arms are lowered to ground level to remove a full pallet box and to substitute and empty one.

By adjusting the length of the upper links 250 and 252 of the parallelogram linkages, the frame 42 may be pitched forward so that the cutter teeth 134 are inclined forwardly and down to ground level. Through trailing shoes 220 and 222 which are pivotally mounted as at 224 and 226 for adjustment, the height of the forward floating end can be set, the levers 228 and 230 being fixed by tightening bolts 232 when set. Through the resilient counter balancing effect of the springs 234, the forward end of the apparatus lightly floats across the ground during the harvest, at the level as set by the shoes 220 and 222, with cutter teeth at ground level.

At any time the floating frame requires lifting above ground level, for transport across the field or down the highway, diagonal hydraulic struts 240 having a piston 242 projecting into a hollow sleeve 244 acts to lift the cutter blade clear of the ground. Such struts may be employed to quickly lift one side or the other of the cutter bar to miss an obstruction.

It will be seen from FIG. 2 that the cut asparagus moves up the ramp with the air flow, after which it drops onto and moves along the conveyor separate from the air blast. It will be seen that the jet blast, being directed toward the "Ryertex" board apron at an angle, will be deflected upward away from conveyor, carrying leaves, dirt, dust and other light material suspended in the air stream several inches above the conveyor belt. Thus asparagus as it travels up the conveyor is not subject to any air blast, which by reason of sand and dirt could damage the asparagus by a "sandblast" action. The current of air is maintained well above the conveyor and spaced therefrom and is assisted in staying in such a suspended stream by the restricting fins of the conveyor side walls at the upper end. The asparagus gravitates into the pallet box beneath the top end of conveyor while the air blast carries the foreign matter over the top at a considerable height above the conveyor belt. The harvester apparatus travels at 7 to 8 miles forward speed and can cover 7 to 8 acres per hour. The conveyor belt moves at approximately ground speed. It will be seen also that by directing the jet slightly to the rear of the cutter, the soil below and ahead of the cutter teeth is not subjected to any air blast, and the raising of dust is avoided.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. Asparagus harvesting apparatus comprising in combination:
   a. mobile frame support means;
   b. a reciprocating cutter bar having an elongated, forwardly disposed cutting edge supported by a fixed support on said frame support means with the cutting edge substantially at ground level;
   c. an endless belt conveyor having a receiving end disposed in spaced relation to said severing means and extending upwardly and rearwardly therefrom to an elevated discharge end;
   d. ramp means fixedly positioned with respect to said frame support means and extending across the space between said severing means and said receiving end of said conveyor, a leading edge of said ramp means holding said cutter bar in engagement with said fixed support; and e. blower means supported by said frame support means to direct an air blast across said ramp means toward said conveyor, thereby moving asparagus cut by said severing means onto said receiving end of said conveyor.

2. The invention according to claim 1 wherein said blower means is so arranged that the air blast therefrom is directed across said ramp means rearwardly of said severing means.

3. The invention according to claim 1 wherein said ramp means comprises a flat plate extending upwardly and rearwardly from said severing means to said receiving end of said conveyor.

4. The invention according to claim 3 wherein the upper surface of said ramp means is substantially coplanar with the material transporting surface of said conveyor, with the trailing edge of said ramp means extending over, but closely spaced to said receiving end of said conveyor.

5. The invention according to claim 1 and further including side wall members extending substantially perpendicularly from said ramp means and the material transporting surface of said conveyor and tapering toward one another as they approach said discharge end of said conveyor.

6. The invention according to claim 5 wherein said side wall members are of decreasing height as they approach said discharge end of said conveyor and include inwardly directed upper edges.

* * * * *